United States Patent
Robinson et al.

(10) Patent No.: US 10,712,836 B2
(45) Date of Patent: Jul. 14, 2020

(54) THREE-DIMENSIONAL INPUT DEVICE

(71) Applicant: HEWLETT-PACKARD DEVELOPMENT COMPANY, L.P., Houston, TX (US)

(72) Inventors: Ian N. Robinson, Palo Alto, CA (US); Hiroshi Horii, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/075,608

(22) PCT Filed: Oct. 4, 2016

(86) PCT No.: PCT/US2016/055351
§ 371 (c)(1),
(2) Date: Aug. 4, 2018

(87) PCT Pub. No.: WO2018/067130
PCT Pub. Date: Apr. 12, 2018

(65) Prior Publication Data
US 2019/0087020 A1    Mar. 21, 2019

(51) Int. Cl.
*G06F 3/0346* (2013.01)
*G06F 3/0484* (2013.01)
*G06F 3/0354* (2013.01)
*G06F 3/0488* (2013.01)
(Continued)

(52) U.S. Cl.
CPC .......... *G06F 3/0346* (2013.01); *G06F 3/033* (2013.01); *G06F 3/03547* (2013.01); *G06F 3/0484* (2013.01); *G06F 3/0488* (2013.01); *G06F 3/04815* (2013.01); *G06F 3/04845* (2013.01); *G06F 3/03541* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 5,729,249 A * | 3/1998 | Yasutake | G06F 3/0338 345/157 |
| RE40,891 E | 9/2009 | Yasutake | |
| 7,969,418 B2 | 6/2011 | Algreatly | |

(Continued)

OTHER PUBLICATIONS

Benko et al., "Sphere: Multi-Touch Interactions on a Spherical Display", Retrieved from Interent: https://www.dgp.toronto.edu/~ravin/papers/uist2008_sphere.pdf, Oct. 10, 2008, pp. 77-86.

(Continued)

*Primary Examiner* — Nitin Patel
*Assistant Examiner* — Amen Woldesenbet Bogale
(74) *Attorney, Agent, or Firm* — Fabian VanCott (57) ABSTRACT

An input device may include at least one touch surface arranged in a three-dimensional (3D) shape wherein the at least one touch surface receives translational and rotational input along three spatial axes. A six degree-of-freedom (6DOF) input system may include at least one touch registering surface formed into a 3D shape to detect an interactive touch from a user and a processor to receive the interactive touch and adjust the position of a three-dimensional (3D) object represented in 3D space on a graphical user interface (GUI).

18 Claims, 7 Drawing Sheets

(51) Int. Cl.
*G06F 3/0481* (2013.01)
*G06F 3/033* (2013.01)

(56) References Cited

U.S. PATENT DOCUMENTS

| | | | |
|---|---|---|---|
| 8,654,104 B2 | 2/2014 | Reisman et al. | |
| 8,810,514 B2 | 8/2014 | Zhao et al. | |
| 8,839,136 B2 | 9/2014 | Yoo et al. | |
| 9,176,577 B2 | 11/2015 | Jangaard et al. | |
| 9,519,371 B2* | 12/2016 | Nishida | G06F 3/04815 |
| 2010/0045666 A1* | 2/2010 | Kornmann | G06F 1/1626 |
| | | | 345/419 |
| 2010/0079405 A1* | 4/2010 | Bernstein | G06F 3/04883 |
| | | | 345/174 |
| 2010/0177053 A2 | 7/2010 | Yasutake | |
| 2012/0157263 A1* | 6/2012 | Sivak | G06F 3/014 |
| | | | 482/4 |
| 2015/0040073 A1* | 2/2015 | Barcay | G06F 3/04815 |
| | | | 715/850 |
| 2015/0103021 A1* | 4/2015 | Lim | G06F 3/017 |
| | | | 345/173 |
| 2015/0350587 A1* | 12/2015 | Kim | H04N 21/42208 |
| | | | 348/734 |
| 2016/0139695 A1* | 5/2016 | Chase | G06F 3/04883 |
| | | | 345/174 |
| 2016/0147308 A1* | 5/2016 | Gelman | H04N 9/31 |
| | | | 345/156 |
| 2020/0012421 A1* | 1/2020 | Kato | G06F 3/0484 |

OTHER PUBLICATIONS

Covarrubias et al., "Force Sensitive Handles and Capacitive Touch Sensor for Driving a Flexible Haptic-Based Immersive System", Sensors, vol. 13, Issue No. 10, 2013, Force Sensitive Handles (FSH), pp. 13487-13508.

Nguyen et al., "3DTouch: A Wearable 3D Input Device for 3D Applications", IEEE, Retrieved from Internet: https://www.researchgate.net/publication/270581225_3DTouch_A_wearable_3D_input_device_for_3D_applications, 2015, pp. 55-61.

* cited by examiner

THREE-DIMENSIONAL INPUT DEVICE

BACKGROUND

Input devices provide data and control signals to an information processing system such as a computer or information appliance. These input devices allow a user to interact with a computing device in order to accomplish a number of tasks.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

As mentioned above, various types of input devices allow a user to interact with a computing device in order to achieve a goal. Often the manipulation of the input device by a user causes a display on a graphical user interface (GUI) to be adjusted or changed in some way as directed by the user. Usually, this direction includes movement on a cursor on the GUI to an object or other graphical representation and activate or manipulate that graphical representation.

With the advent of three-dimensional (3D) computer aided design (CAD), for example, the use of existing input devices such as a mouse may not be as intuitive to a user. This is because the user is left to implement a two-dimensional (2D) device to augment, adjust, and/or otherwise change a 3D object represented on the GUI in virtual or augmented 3D space. Thus, it may be difficult for a user to translate 2D movements into a 3D space using a single input device on a 2D plane.

The present specification, therefore describes an input device may include at least one touch surface arranged in a three-dimensional (3D) shape wherein the at least one touch surface receives translational and rotational input along three spatial axes.

The present specification further describes a six degree-of-freedom (6DOF) input system may include at least one touch registering surface formed into a 3D shape to detect an interactive touch from a user and a processor to receive the interactive touch and adjust the position of a three-dimensional (3D) object represented in 3D space on a graphical user interface (GUI).

The present specification also describes a method of manipulating a 3D object represented on a graphical user interface (GUI) including detecting at least two touch points on the surface of a three-dimensional touch sensitive object; detecting the movement of the at least two touch points relative to each other; and representing movement of the 3D object represented on the GUI based on the detected movement of the at least two touch points.

As used in the present specification and in the appended claims, the term "three-dimensional object" is meant to be understood broadly as any polytope, polyhedron, or other convex three-dimensional shape, with any number of flat or curved sides and/or edges.

Additionally, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
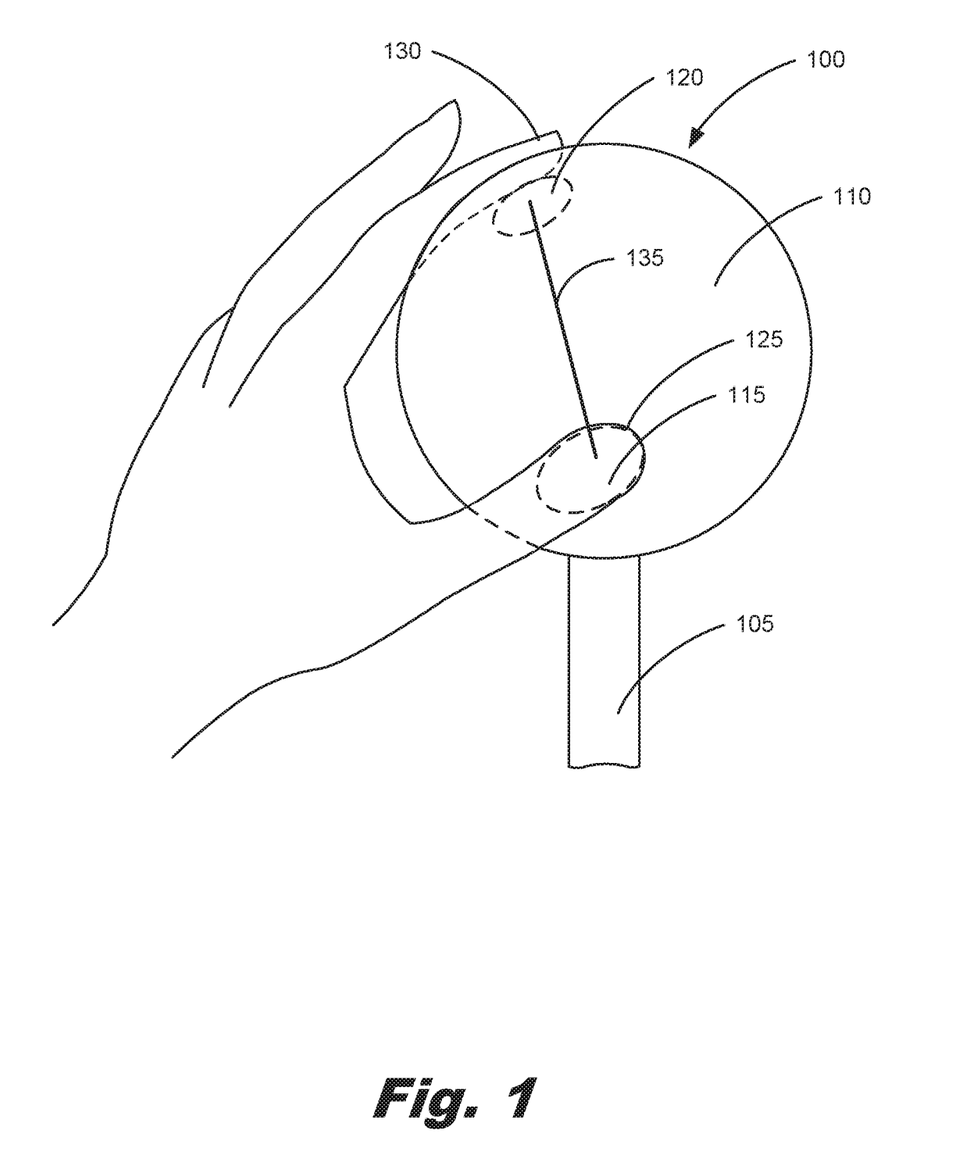
FIG. 1 is a perspective view of an input device according to an example of the principles described herein.

Turning to the figures, FIG. 1 is a perspective view of an input device (100) according to an example of the principles described herein. The input device (100) is arranged or formed into a three-dimensional (3D) shape; in this example a sphere. Although FIG. 1 shows the 3D shape of the input device as being a sphere, the shape of the input device (100) may be any shape with which the user can touch and handle as described herein. In an example, the shape of the input device (100) may be formed to fit ergonomically with a user's hand thereby allowing a user to interact with the input device (100) as described herein.

The input device (100) may include a support member (105). The support member may support the input device (100) a distance above, for example, a desk where the input device is located. Because the input device (100) may be communicatively coupled to a computing device, the support member (105) may be structurally coupled to the desk or surface on which the computing device rests. In the example shown in FIG. 1, the support member (105) is in the form of a stick or rod.

The surface (110) of the input device (100) may be any tactile sensor that detects the touch from a user. In an example, the surface (110) is a capacitive sensitive surface that measures the capacitive virtual ground of a user's finger or touch. In an example, the surface (110) is a resistive touchscreen that detects a resistance as a user touches the surface (110). In an example, the surface (110) may include a number of trackballs. Other types of tactile sensitive surfaces may be used and the present specification contemplates the use of such surfaces (110).

The input device (100) and its surface (110) may be communicatively coupled to a computing device. Examples of computing devices include servers, desktop computers, laptop computers, personal digital assistants (PDAs), mobile devices, smartphones, gaming systems, and tablets, among other electronic devices.

The computing device with the input device (100) may be utilized in any data processing scenario including, stand-alone hardware, mobile applications, through a computing network, or combinations thereof. Further, the computing device may be used in a computing network, a public cloud network, a private cloud network, a hybrid cloud network, other forms of networks, or combinations thereof. The present systems may be implemented on one or multiple hardware platforms, in which modules in the system can be executed on one or across multiple platforms.

To achieve its desired functionality, the computing device comprises various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of receiving input from at least the input device (100) according to the methods of the present specification described herein. In the course of executing code, the processor may receive input from and provide output to a number of the remaining hardware units.

The data storage device may store data such as executable program code that is executed by the processor or another processing device. The data storage device may specifically store computer code representing a number of applications that the processor executes to implement at least the functionality described herein.

The data storage device may include various types of memory modules, including volatile and nonvolatile memory. For example, the data storage device of the present example computing device may include Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

Generally, the data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the computing device enable the processor to interface with various other hardware elements, external and internal to the computing device. For example, the peripheral device adapters may provide an interface to input/output devices, such as, for example, display device, a mouse, a keyboard and/or the input device (100( )) described herein.

The peripheral device adapters may also provide access to other external devices such as an external storage device, a number of network devices such as, for example, servers, switches, and routers, client devices, other types of computing devices, and combinations thereof.

The display device may be provided to allow a user of the computing device and input device (100) to interact with and implement the functionality of the input device (100). The peripheral device adapters may also create an interface between the processor and the display device, a printer, or other media output devices. The network adapter may provide an interface to other computing devices within, for example, a network, thereby enabling the transmission of data between the computing device and other devices located within the network.

The executable code may, when executed by the processor, display the number of graphical user interfaces (GUIs) on the display device associated with the executable program code representing the number of applications stored on the data storage device. The GUIs may display, for example, objects that may be manipulated, changed, and/or moved by the input device (100). Additionally, via making a number of interactive gestures on the GUIs of the display device, a user may manipulate an object such as a 3D object presented in a virtual reality or augmented reality environment such as a CAD program executed by the processor. Examples of display devices include a computer screen, a laptop screen, a mobile device screen, a personal digital assistant (PDA) screen, and a tablet screen, among other display devices.

During operation of the input device (100) a user may contact the input device (100) at two locations or touch points. In the example shown in FIG. 1, a user contacts the sphere input device (100) at a first touch point (115) and an opposing second touch point (120) both indicated by dashed circles. The two touch points (115, 120) that result from the user touching the sphere between a thumb (125) and finger (130), for example, define a line (135) with a particular orientation in 3D space within, for example, a CAD program executed by the processor on the computing device and provided as visual output to the user on the GUI.

Manipulation of a 3D object in a 3D space represented on the GUI may be controlled via the first (115) and second touch points (120). As will be described below, movement of the user's fingers and thumbs on the surface of the sphere input device (100) causes the 3D object to be moved, manipulated, and/or changed as described herein.

Figure 2A:
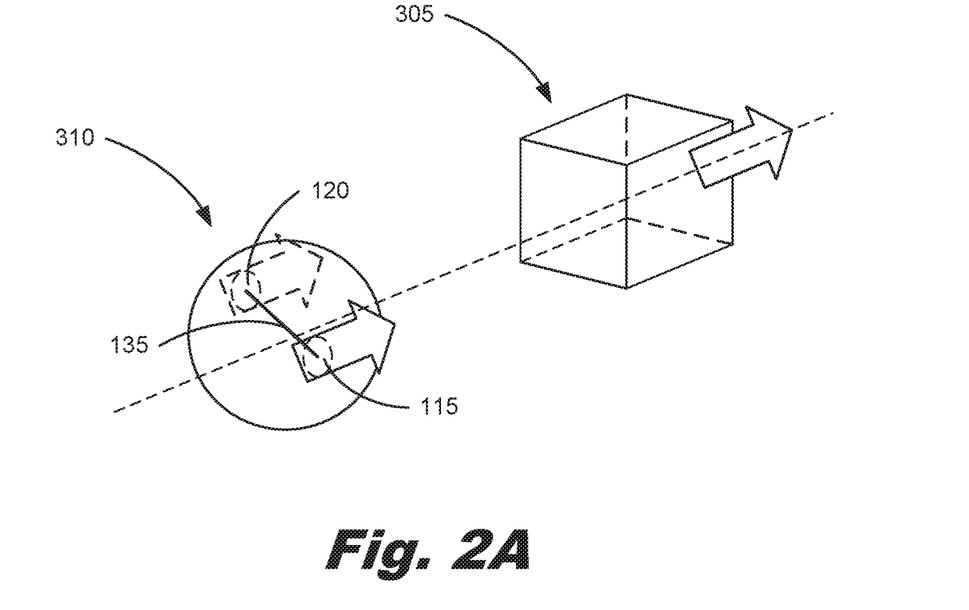
FIGS. 2A and 2B are perspective diagrams of movement of a 3D virtual object based on first and second touch points on a 3D shaped input device according to an example of the principles described herein.

FIGS. 2A and 2B are perspective diagrams of movement of a 3D virtual object (305) based on first (115) and second touch points (120) on a 3D shaped input device (310) according to an example of the principles described herein. FIG. 2A is a perspective diagram of translation movement of a 3D virtual object (305) based on a translation of a first (115) and second touch points (120) on a surface of a 3D shaped input device (310) according to an example of the principles described herein. During operation of the input device (100), a user may adjust the placement of a 3D virtual object (305) by translating the user's thumb and finger along the surface in the same direction. Such a translation may be along any direction lying in a plane perpendicular to the line (135) formed between the first (115) and second touch points (120). In an example, translation of the 3D virtual object (305) may be restricted to the available surface of the 3D shaped input device (310). In such an example, a user may be provided with a user interface on the GUI that allows the user to adjust the amount of movement the 3D virtual object (305) undergoes while performing the translation maneuver described above. Additionally, where the physical surface of the 3D shaped input device (310) does not allow a user to translate the 3D virtual object (305) with the 3D virtual workspace, the user may release the 3D shaped input device (310) after the translation maneuver and repeat the same maneuver to translate the 3D virtual object (305) an additional amount.

Figure 2B:
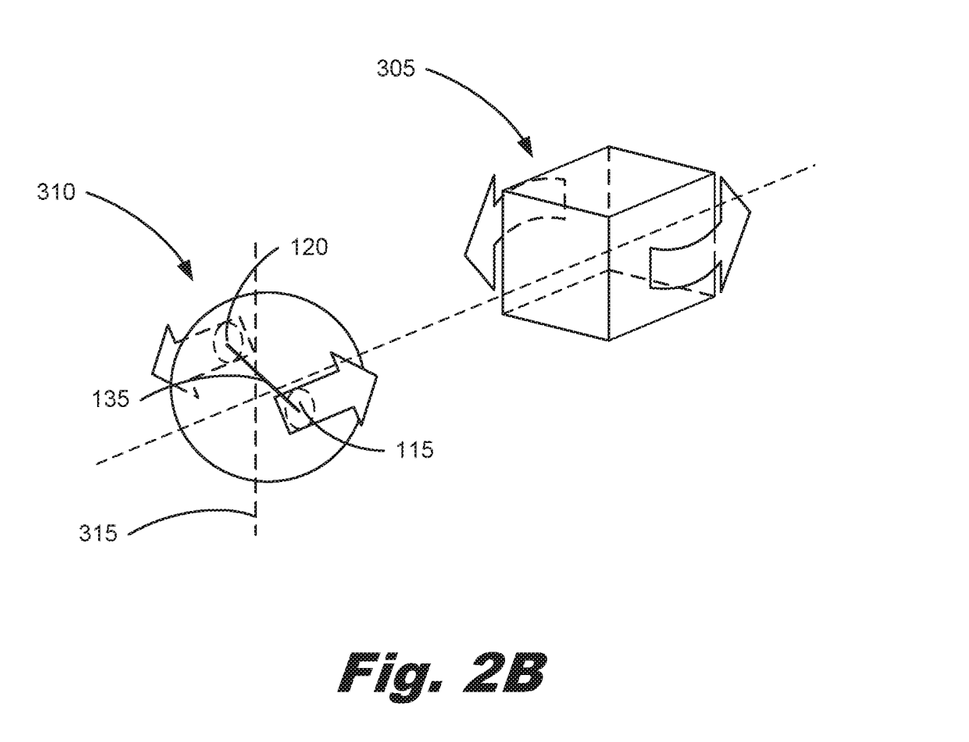

Similarly, FIG. 2B is a perspective diagram of rotational movement of a 3D virtual object (305) based on a rotation of a first (115) and second touch points (120) on a surface of a 3D shaped input device (310) according to an example of the principles described herein. During operation of the input device (100), a user may adjust the placement of a 3D virtual object (305) by rotating the user's thumb and finger about the surface in opposite directions. Such a rotation may be about any axis (315) lying in a plane perpendicular to the line (135) formed between the first (115) and second touch points (120). Again, similar to the translation maneuver described above, a user may be provided with a GUI that allows a user to choose the amount of rotation that the 3D virtual object (305) undergoes when the rotation maneuver is conducted. Additionally, the user may conduct the above described rotational maneuver repeatedly in order to rotate the 3D virtual object (305) using the 3D shaped input device (310) a desired amount. Again, this may be accomplished by the user first conducting the rotational maneuver, releasing the touch on the 3D shaped input device (310), and once again conducting the rotational maneuver again.

Figure 3A:
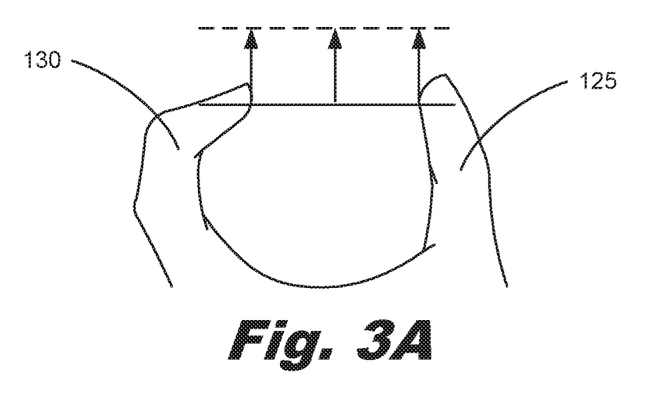
FIGS. 3A through 3C are each top views of a user's finger and thumb interaction with the 3D input device of FIG. 1 according to an example of the principles described herein.
Figure 3B:
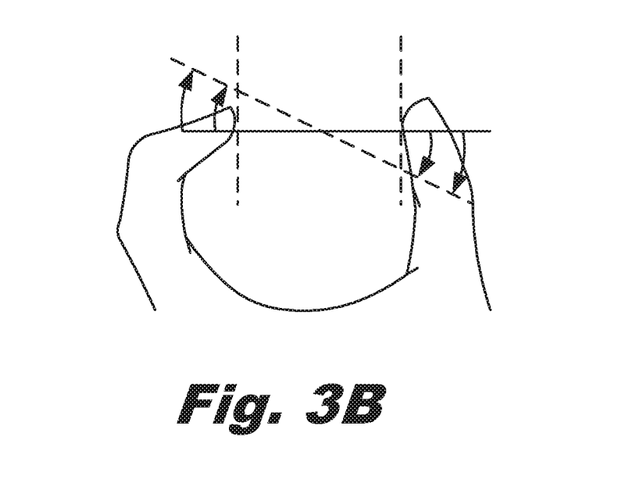
Figure 3C:
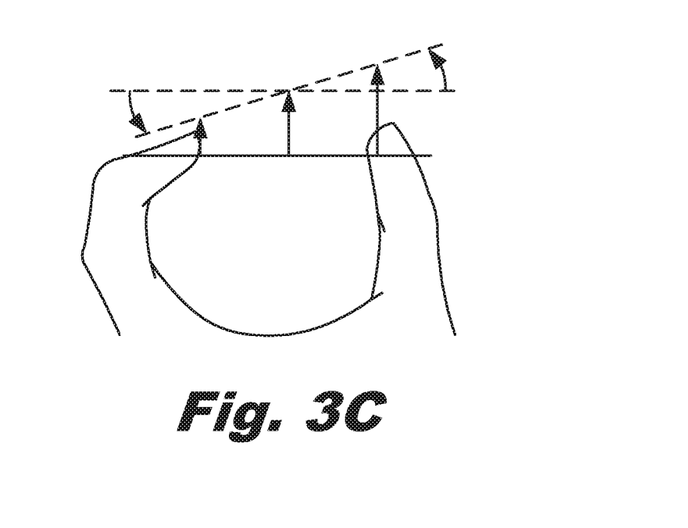

Along with the mapping of a translational and rotational movement of the 3D virtual object (305), a user may simultaneously translate and rotate his or her thumb and finger over the surface of the 3D shaped input device (310) as described above in order to simultaneously translate and rotate the 3D virtual object (305). FIGS. 3A through 3C are each top views of a user's finger and thumb interaction with the 3D input device of FIG. 1 according to an example of the principles described herein. FIG. 3A shows the translation of a user's finger and thumb over the surface of a 3D shaped input device (310) to affect a translation of a 3D virtual object (305). As described above, the translation of the 3D virtual object (305) is accomplished by passing the user's finger and thumb across the surface of the 3D shaped input device (310) at the same time and at the same rate.

FIG. 3B shows the rotation of a user's finger and thumb over the surface of a 3D shaped input device (310) to affect a rotation of a 3D virtual object (305). As described above, the rotation of the 3D virtual object (305) is accomplished by passing the user's finger and thumb across the surface of the 3D shaped input device (310) at the same time and at the same rate in opposite directions.

FIG. 3C shows a hybrid translation-rotation of a user's finger and thumb over the surface of a 3D shaped input device (310) to affect a hybrid translation-rotation of a 3D virtual object (305). In this example, the rotation and simultaneous translation of the 3D virtual object (305) is accomplished by passing the user's finger and thumb across the surface of the 3D shaped input device (310) at varying rates and/or in opposite directions. The rate of either the thumb or finger as compared to the other will determine the amount of translation and rotation that is mapped to the 3D virtual object (305) during this maneuver.

As described above, the surface of the 3D shaped input device (310) is a tactile surface that can detect a touch from a user and convert that touch into input for a processor. In the examples shown in FIGS. 1-3C, the tactile surface of the 3D shaped input device (310) can detect at least two touch points (115, 120). As a result, a 3D virtual object (305) may be translated and/or rotated within the six degrees of freedom available in a 3D virtual or augmented space depicted on a GUI. For example, the 3D virtual object (305) may be translated in multiple directions in the 3D virtual space: left, right, forward, backwards, up, and down. Additionally, the 3D virtual object (305) may be rotated about any axis running thorough the 3D virtual object (305).

Figure 4A:
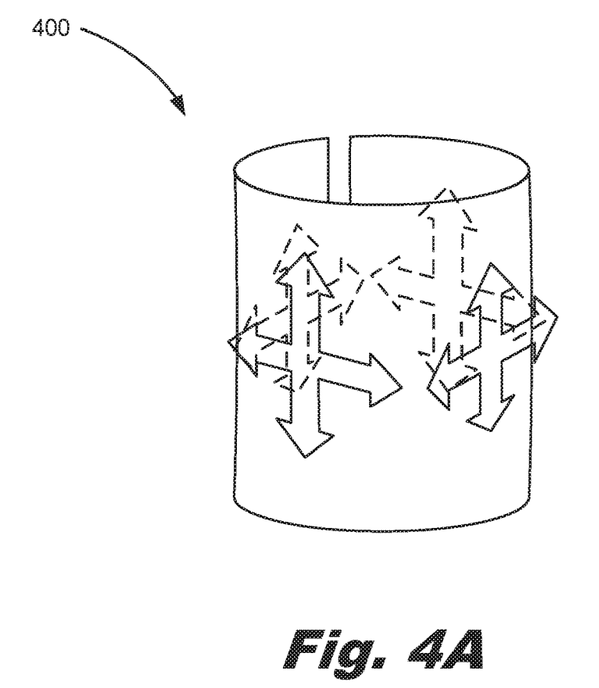
FIGS. 4A and 4B are perspective views of input devices according to a number of examples of the principles described herein.
Figure 4B:
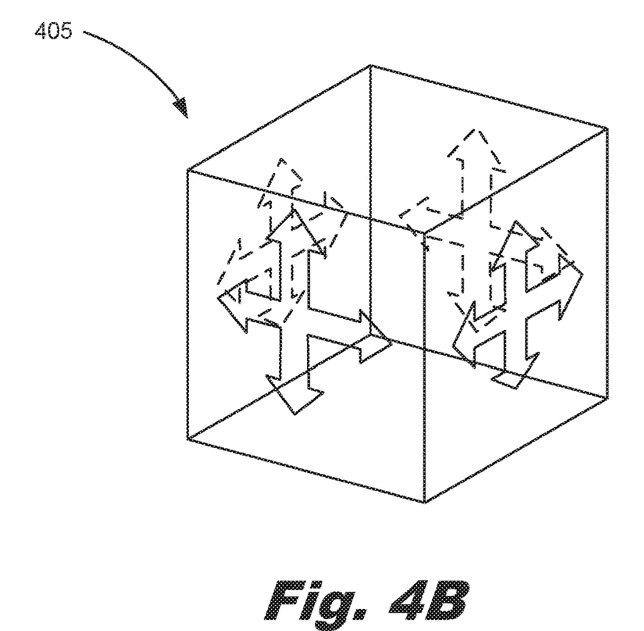

FIGS. 4A and 4B are perspective views of input devices (400, 405) according to a number of examples of the principles described herein. As described above, the input devices (400, 405) may be formed into a number of different 3D shapes. FIG. 4A shows a cylindrical shaped input device (400) that also provides the six degrees of movement of a 3D virtual object (305). This cylindrical shaped input device (400) may not permit a user to select any orientation in space. However, translations and rotations may be restricted to the three major axes (x, y, and z) in a Cartesian coordinate system. Consequently, the cylindrical shaped input device (400) would be sufficient to capture all six degrees of freedom for translation and rotation of the 3D virtual object (305). In this example, absolute positions of the touch points on the surface may not matter, and the processor may translate or rotate the 3D virtual object (305) based on the delta-x, delta-y motions on the surface of the cylindrical shaped input device (400). The processor could execute computer readable program code that receives input allowing for motion along and/or about one axis at a time. In this example, the single axis along the x or y axis may be chosen based on whichever axis input is greater. This may prevent small inadvertent motions along and/or about other axes, other than the one intended, from being registered.

FIG. 4B shows a box-shaped input device (405) that also provides the six degrees of movement of a 3D virtual object (305). In this example, the box-shaped input device (405) may not include the top and bottom sides thereby allowing a user to set the box-shaped input device (405) on a flat surface during operation. Similar to the cylindrical shaped input device (400), the box-shaped input device (405) may not permit a user to select any orientation in space. However, translations and rotations may be restricted to the three major axes (x, y, and z) in a Cartesian coordinate system. Consequently, the box-shaped input device (405) would be sufficient to capture all six degrees of freedom for translation and rotation of the 3D virtual object (305). In this example, absolute positions of the touch points on the surface may not matter, and the processor may translate or rotate the 3D virtual object (305) based on the delta-x, delta-y motions on the surface of the box-shaped input device (405). The processor could execute computer readable program code that receives input allowing for motion along and/or about one axis at a time. In this example, the single axis along the x or y axis may be chosen based on whichever axis input is greater. This may prevent small inadvertent motions along and/or about other axes, other than the one intended, from being registered.

In either of the examples described above, the 3D shaped input device (310, 400, 405) may include a number of trackballs. In an example the number of trackballs is four with each trackball within a pair of trackballs being positioned opposite each other. The number of trackballs may be inserted into any number of planes of the 3D shaped input device (310, 400, 405) and serve as the touch surface that receives input from the user as described herein. Much like the touch sensitive surface of the above described 3D shaped input devices (310, 400, 405), each trackball may receive input that allows a user to translate and/or rotate a 3D virtual object (305) within a 3D workspace represented on a GUI.

In addition to the 3D shaped input device (310, 400, 405) being used to translate and/or rotate a 3D virtual object (305) in a 3D virtual space, the 3D shaped input device (310, 400, 405) may also allow a user to change the user's viewpoint of that workspace. In this example, the same 3D shaped input device (310, 400, 405) can be used for both tasks by switching between modes via a hard button coupled to the 3D shaped input device (310, 400, 405) or a soft keyed button represented on the GUI. In an example, switching between changing the position of the 3D virtual object (305) and changing the user's viewpoint may be accomplished by discriminating between gestures using one finger and a thumb (e.g. registered as instructions to rotate and/or translate the 3D virtual object (305)) and two fingers and a thumb (e.g. registered as instructions to change the view in the 3D workspace). In an example, switching between changing the position of the 3D virtual object (305) and changing the user's viewpoint may be accomplished by pressing one of the number of the above described trackballs into the surface of the 3D shaped input device (310, 400, 405).

In an example, the 3D shaped input device (310, 400, 405) may be mounted to, for example, a force-based input device. In this example, the user may grip and push/twist on the non-touch-sensitive sections of the device to change the view direction.

Figure 5:
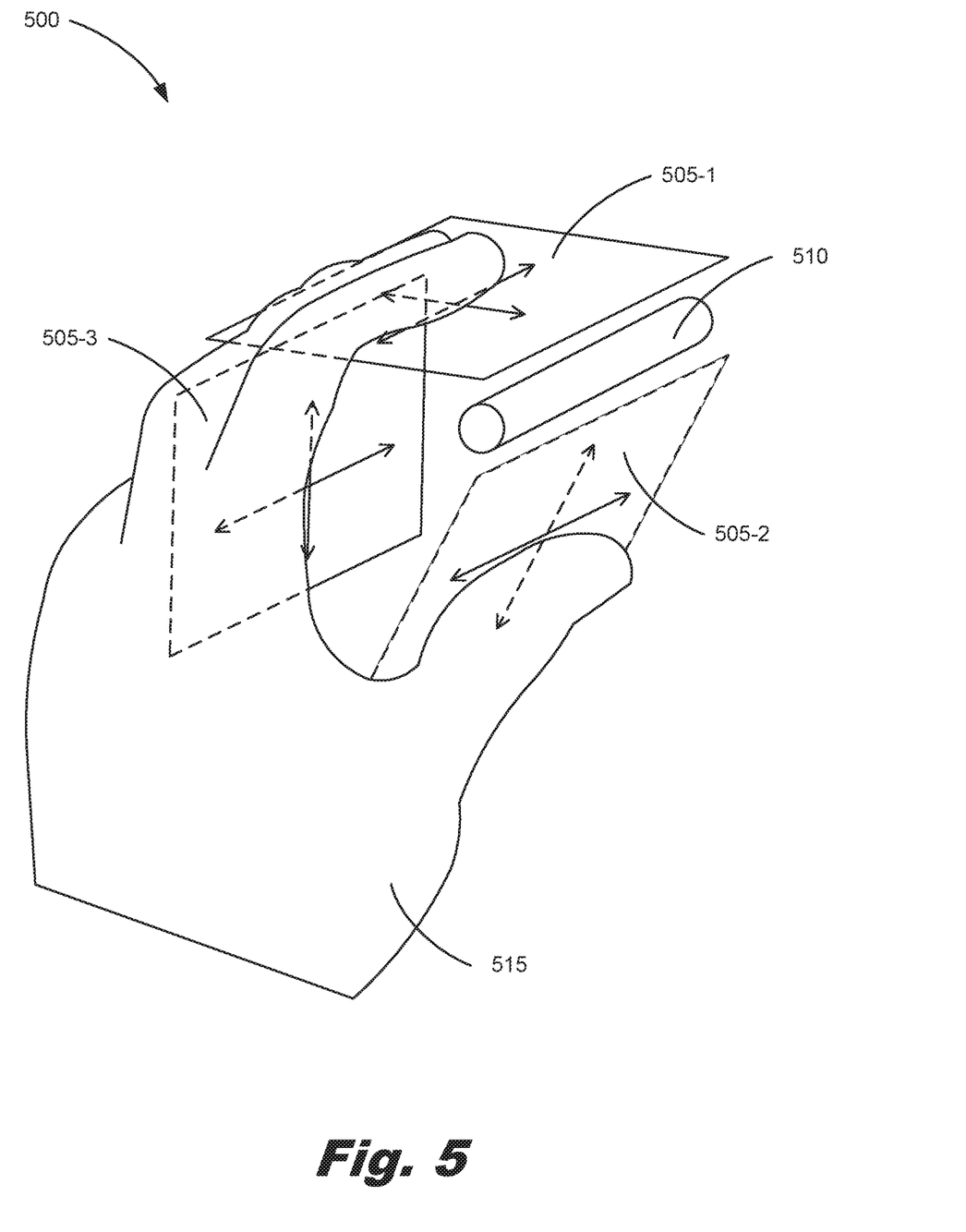
FIG. 5 is perspective view of an input device according to an example of the principles described herein.

FIG. 5 is perspective view of an input device (500) according to an example of the principles described herein. In this example, the input device (500) may be formed of three surfaces (505-1, 505-2, 505-3). These surfaces may be connected to each other and/or support member (510). The support member may secure the three surfaces (505-1, 505-2, 505-3) in a fixed relatively more agronomical position for a user's hand (515) to grasp. Similar to FIG. 4B, the three surfaces (505-1, 505-2, 505-3) of this 3D input device (500) may not permit a user to select any orientation in space. However, translations and rotations may be restricted to the three major axes (x, y, and z) in a Cartesian coordinate system. In this example the surface facing the user's thumb (505-2) serves as the opposing surface for both of the other two surfaces (505-1, 505-3). Consequently, the 3D input device (500) would be sufficient to capture all six degrees of freedom for translation and rotation of the 3D virtual object (305). In this example, absolute positions of the touch points on the surface may not matter, and the processor may translate or rotate the 3D virtual object (305) based on the delta-x, delta-y motions on the three surfaces (505-1, 505-2, 505-3) of the 3D input device (500). The processor could execute computer readable program code that receives input allowing for motion along and/or about one axis at a time. In this example, the single axis along the x or y axis may be chosen based on whichever axis input is greater. This may prevent small inadvertent motions along and/or about other axes, other than the one intended, from being registered.

In an example, the three surfaces (505-1, 505-2, 505-3) of the input device (500) may be adjustable such that a user's particular grip may be accommodated for. In this example, each of the three surfaces (505-1, 505-2, 505-3) may be rotated or translated away from, towards, or about the support member (510) in order to fit ergonomically with the user's hand (515). In an example, the support member (515) may be affixed to a portion of a desk to maintain the input device (500) in an accessible position.

Figure 6:
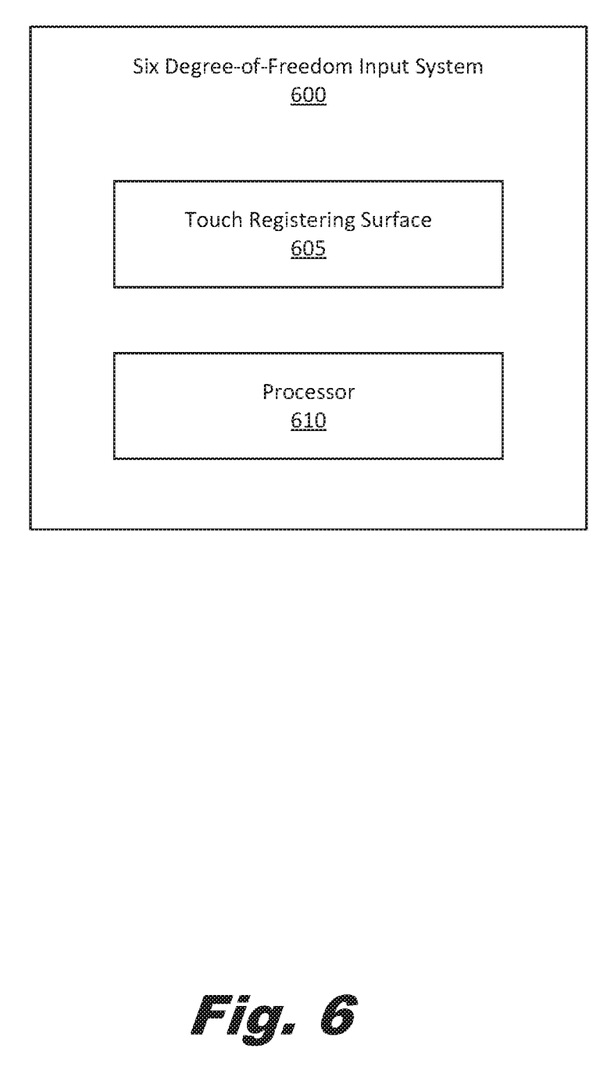
FIG. 6 is a block diagram of a six degree-of-freedom input system according to an example of the principles described herein.

FIG. 6 is a block diagram of a six degree-of-freedom input system (600) according to an example of the principles described herein. The six degree-of-freedom input system (600) may include a touch registering surface (605) and a processor (610). As described above, the six degree-of-freedom input system (600) may further include a computing device of which the processor (610) is a part of. However, the processor (610) may be part of any other computing device or as part of the touch registering surface (605).

As also described above, the six degree-of-freedom input system (600) may further include a graphical user interface to display a 3D object within a 3D workspace. The GUI may be communicatively coupled to the processor (610) to display, via execution of computer usable program code, the 3D workspace and 3D object. As the user uses the touch registering surface (605) as described above, the processor (610) maps the touches to the object and manipulates the object as described above.

Figure 7:
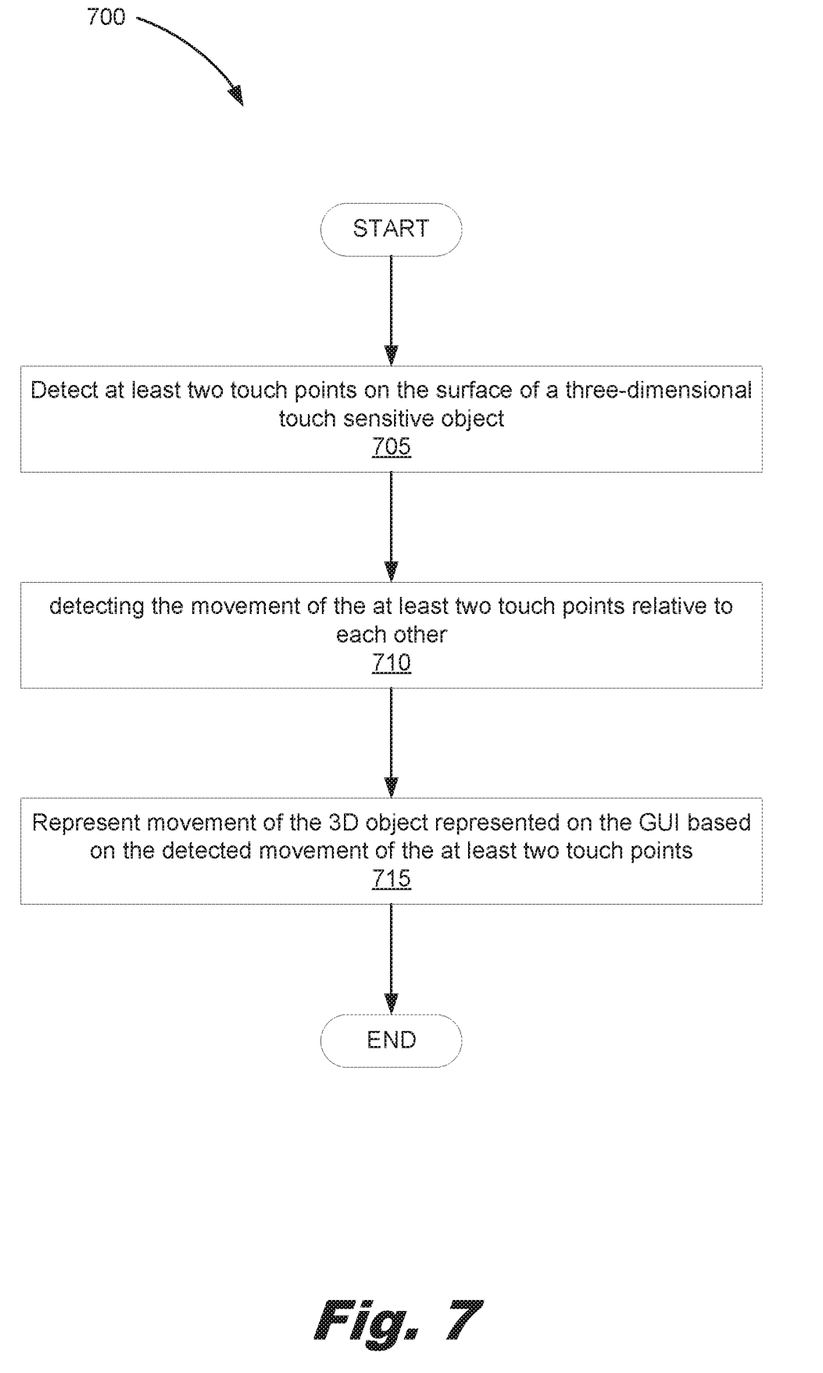
FIG. 7 is a flowchart showing a method of manipulating a 3D object represented on a graphical user interface (GUI) according to one example of the principles described herein.

FIG. 7 is a flowchart showing a method (700) of manipulating a 3D object represented on a graphical user interface (GUI) according to one example of the principles described herein. The method may begin by detecting (705) at least two touch points on the surface of a three-dimensional touch sensitive object. The detection may be a result of detecting a capacitive or resistive change on the surface of the three-dimensional touch sensitive object. As described above, these two touch points create a virtual line in a virtual 3D workspace.

The method (700) may continue by detecting (710) the movement of the at least two touch points relative to each other. The movement of the two touch points relative to each other may indicate to a processor that a 3D virtual object within a 3D workspace represented by a GUI is to be translated, rotated, or both. The movement of the at least two touch points is mapped onto the 3D object or 3D workspace in order to adjust the position of either.

The method (700) may continue by representing (715) the movement of the 3D object represented on the GUI based on the detected movement of the at least two touch points. In an example, the movement of the user's finger and thumb as described above is provided to the processor which interprets the data and causes the 3D object to be translated and/or rotated according to the user's movement of his or her fingers over the surface of the 3D touch registering surface.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (610) of a computing device or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a three-dimensional (3D) input device. The 3D input device allows a user to relatively more intuitively interact with, for example, a 3D object represented on a GUI in a 3D workspace. As the user interacts with the 3D input device, the 3D input device detects two touch points that provide translational and/or rotational data to a processor to direct the 3D object to translate and/or rotate. The shape of the input device (3D shape) allows for a user to translate and/or rotate the virtual 3D object along or about any of the three spatial axes.

The preceding description has been presented to illustrate and describe examples of the principles described. This description is not intended to be exhaustive or to limit these principles to any precise form disclosed. Many modifications and variations are possible in light of the above teaching.

What is claimed is:

1. An input device, comprising:
   at least one touch surface arranged in a three-dimensional (3D) shape;
   a processor for interpreting multiple touch contacts that slide over the at least one touch surface;
   wherein the processor is to interpret when movement of two different touch contacts causes movement of a virtual three-dimensional object displayed on a display device or movement of a viewpoint of the virtual object as shown by the display device;
   wherein sliding movement of the two touch points over the at least one touch surface in a same direction at different rates causes simultaneous translation and rotation of the virtual object or a viewpoint of the virtual object on the display device of a computing device associated with the input device.

2. The input device of claim 1, wherein the 3D shape is a sphere.

3. The input device of claim 2, wherein the sphere is coupled to a rod and wherein the rod is fixed to a surface to allow the sphere to be positioned above the surface.

4. The input device of claim 1, wherein the 3D shape is a column.

5. The input device of claim 1, wherein the 3D shape is a cube.

6. The input device of claim 1, wherein sliding movement of the two touch points over the at least one touch surface in a same direction causes a visual translation of the virtual object or a viewpoint of the virtual object on the display device of a computing device associated with the input device.

7. The input device of claim 1, wherein sliding movement of the two touch points over the at least one touch surface in opposite directions causes a visual rotation of the virtual object or a viewpoint of the virtual object on the display device of a computing device associated with the input device.

8. The input device of claim 1, the processor to interpret one of the two touch contacts made with two fingers as indicating that the slide of the two touch contacts directs rotation of the viewpoint of the virtual object as opposed to rotation of the displayed object.

9. The input device of claim 1, the processor to interpret a user pressing at one of the two touch contacts as indicating that the slide of the two touch contacts directs rotation of the viewpoint of the virtual object as opposed to rotation of the displayed object.

10. The input device of claim 1, the 3D shape consisting of three planar surfaces.

11. A six degree-of-freedom (6DOF) input system, comprising:
    at least one touch registering surface formed into a 3D shape to detect an interactive touch from a user;
    a processor to receive the interactive touch and adjust the position of a three-dimensional (3D) object represented in 3D space on a graphical user interface (GUI);
    the 3D shape consisting of three planar, touch registering surfaces;
    wherein the touchpad detects at least two points on the touch registering surface and wherein:
    movement of the two points in the same direction causes a visual translation of a visual object represented on the GUI;
    movement of the two points in opposite directions causes a visual rotation of the visual object represented on the GUI; and
    movement of the two points in the same direction at different rates causes simultaneous translation and rotation of the visual object represented on the GUI.

12. The 6DOF input system of claim 11, wherein the processor further receives the interactive touch from the at least one touch registering surface and adjusts a viewpoint of a user respective to the three-dimensional (3D) object represented in 3D space on a graphical user interface (GUI).

13. The 6DOF input system of claim 12, wherein the three planar surfaces are arranged as a triangular prism.

14. The 6DOF input system of claim 11, wherein the at least one touch registering surface comprises a trackball.

15. The 6DOF input system of claim 14, wherein pressing of the trackball indicates input to move a viewpoint of the visual object rather than the visual object itself.

16. The 6DOF input system of claim 11, wherein one of the three planar surfaces serves as an opposing surface for either of the other two surfaces.

17. A method of manipulating a 3D object represented on a graphical user interface (GUI), comprising:
    detecting at least two touch points on the surface of a three-dimensional touch sensitive object; p1 representing movement of the 3D object or a viewpoint of the 3D object represented on the GUI based on the detected movement of the at least two touch points, wherein when one of the two touch points is made with two fingers, the sliding movement causes movement of the viewpoint of the 3D object rather than of the 3D object itself on the GUI.

18. The method of claim 17, wherein the detecting the movement of the at least two touch points relative to each other comprises detecting:
    a translation action when the at least two touch points move in the same direction relative to each other; and
    a rotation action when the at least two touch points move in an opposite direction relative to each other.

* * * * *